United States Patent [19]

Beiser et al.

[11] Patent Number: 4,852,778
[45] Date of Patent: Aug. 1, 1989

[54] COMBINATION BICYCLE BAG AND HANDBAG

[75] Inventors: Wayne Beiser, Cincinnati, Ohio; Amy A. Bloom, Shillington, Pa.

[73] Assignee: Huffy Corporation, Miamisburg, Ohio

[21] Appl. No.: 161,290

[22] Filed: Feb. 25, 1988

Related U.S. Application Data

[63] Continuation of Ser. No. 914,683, Oct. 2, 1986, abandoned.

[51] Int. Cl.⁴ .............................................. B62J 9/00
[52] U.S. Cl. ................................. 224/30 A; 224/151; 224/258; 224/36; 224/42.01
[58] Field of Search ................... 224/30 A, 31, 32 R, 224/34, 35, 36, 41, 42.01, 30 R, 205, 257, 258, 901, 151, 270

[56] References Cited

U.S. PATENT DOCUMENTS 2,552,443  5/1951  Molinari ........................... 224/30 R
4,186,859  2/1980  Frankfort et al. ................. 224/205

FOREIGN PATENT DOCUMENTS 3244492  6/1984  Fed. Rep. of Germany .... 224/30 R

Primary Examiner—Renee S. Luebke
Attorney, Agent, or Firm—Biebel, French & Nauman

[57] ABSTRACT

A combination bicycle and handbag includes a bag body, a continuous strap attached at its ends to the bag body to form a closed loop, and pairs of complementary fastener members attached to the strap adjacent to its ends and positioned on the strap such that portions of the strap which include the fastener members may be looped about a handlebar crossbar and secured thereto by engagement of the complementary fastener members such that the bag body is suspended from the crossbar. The fastener members preferably are of the releasable type, such as snaps or strips of hook and loop material so that the bag maybe removed from the crossbar and used as a handbag with a shoulder strap.

5 Claims, 1 Drawing Sheet

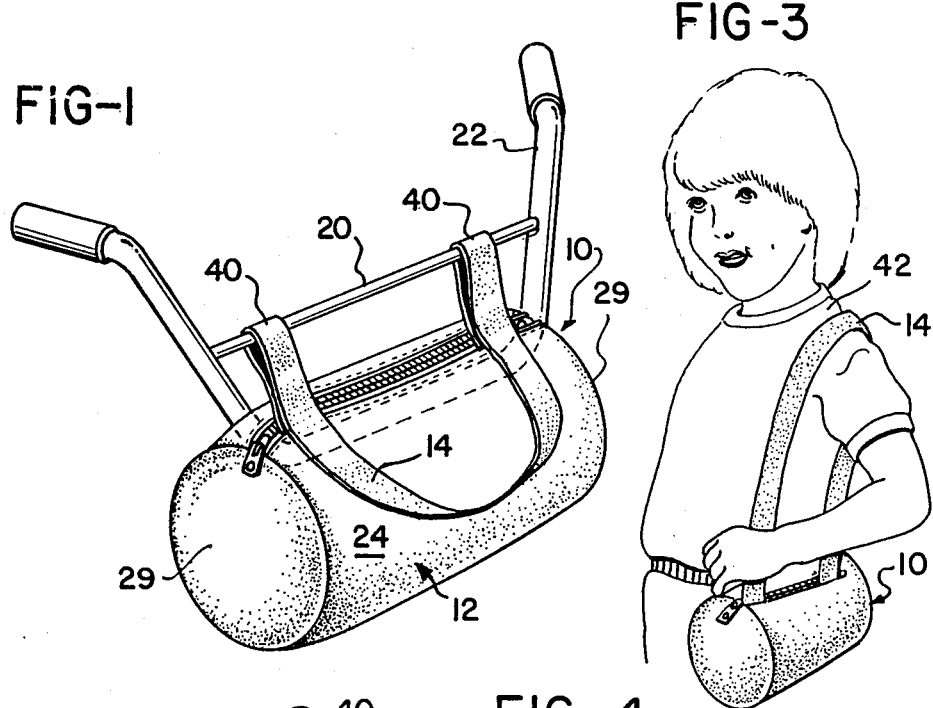
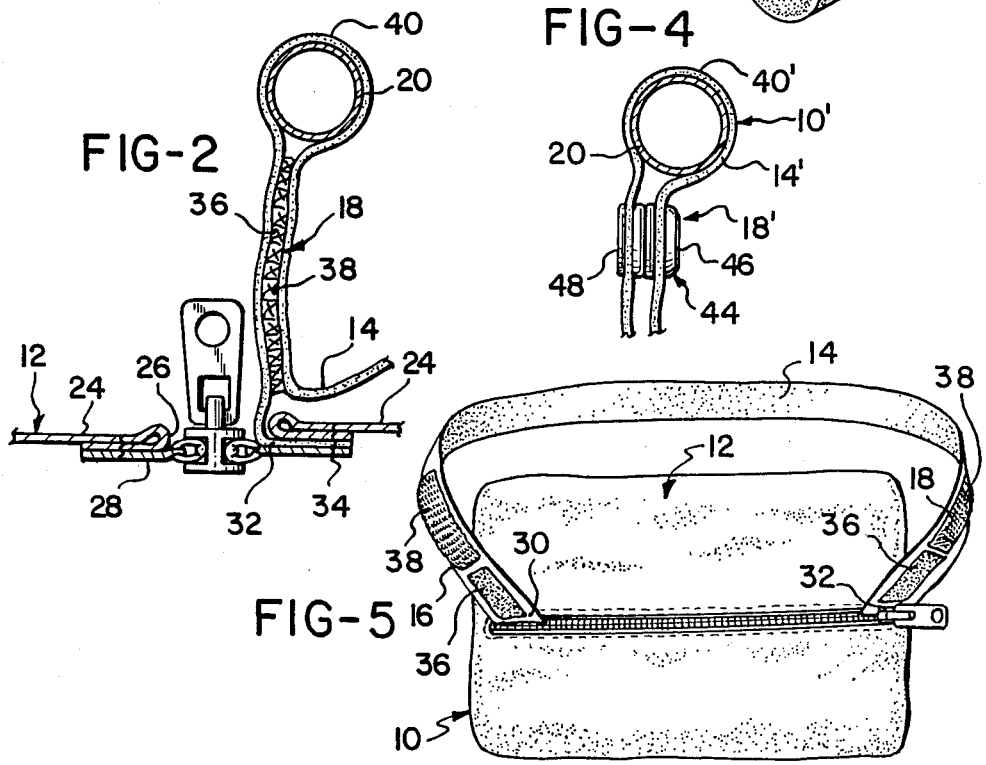

COMBINATION BICYCLE BAG AND HANDBAG

This is a continuation of co-pending application Ser. No. 914,683, filed Oct. 2, 1986, now abandoned.

BACKGROUND OF THE INVENTION

The present invention relates to bicycle bags and, more particularly, to bicycle bags which are removable from a bicycle to be used as handbags.

Bicycle bags which may be attached to the handlebars of a bicycle are a popular and common bicycle accessory. Included among the many types of bicycle bags are those which are readily removable from the handlebars of a bicycle and can be carried by the rider when not using the bicycle.

For example, Jackson et al. U.S. Pat. No. 3,955,728 discloses a handlebar bag which comprises a bag body made of a flexible material with an elongate slit that is opened and closed by a slide fastener. A pair of strap segments are attached at their ends to the ends of the bag body, and the free ends of the segments include strips of hook and loop material. To attach that bag to a bicycle, the bag is positioned in front of the handlebar crossbar, the strap segments are looped about the handlebar handles to secure the bag to the handlebar, and the free ends of the strap segments are attached to a strip of complementary hook and loop material mounted on the upper surface of the bag body. The bag also includes elastic straps which attach to the front fork of the bicycle.

In order to convert the bag from a bicycle bag to a handbag with a shoulder strap, a third strap segment, having complementary strips of hook and loop material at its ends, is attached to the free ends of the strap segments to form a loop sized to fit over the shoulder of a user.

Another type of bag is shown in Schroeder U.S. Pat. No. 4,261,491. That patent discloses a bag having a pair of continuous straps attached at their ends to the bag body. The bag body includes a flat surface which is placed upon the rear luggage rack of a bicycle, and the straps are looped about bosses which extend outwardly from the junctions of the chain stays and seatmast stays of the bicycle frame.

A disadvantage with both of the aforementioned bicycle bags is that additional components are needed either to convert the bag to a handbag, or to mount the bag on a bicycle frame. With the former, it is necessary to provide a third strap segment to form a loop which functions as a shoulder strap. With the latter, a bicycle luggage rack is needed and the bicycle frame must be fitted with lugs at the appropriate location. Accordingly, there is a need for a bicycle bag which readily converts to a handbag and which does not require additional components either to convert to a handbag or to be mounted on the bicycle.

SUMMARY OF THE INVENTION

The present invention is a combination bicycle bag and handbag which consists of a bag body, a continuous strap attached at its ends to the bag body, and pairs of complementary fastener members attached to the strap. The bag is attached to the handlebar of a bicycle by looping portions of the strap including the complementary fastener members about the handlebar crossbars and engaging the fastener members. When attached to a handlebar, the bag body is suspended from the crossbar by the ends of the strap. To remove the bag from the handlebar, the fastener members simply are disengaged from each other, thereby allowing the strap to be removed from the crossbar.

In a preferred embodiment of the invention, the fastener members include strips of hook and loop material which are located on the strap adjacent its ends. In an alternate embodiment, the fastener members include a pair of snaps, the male and female components of which are spaced from each other to allow the intervening segment of strap to extend about a handlebar crossbar.

With either embodiment, the invention provides an advantage over prior art combination bags in that a single, unitary strap functions as both the means for attaching the bag to the handlebar, and as a shoulder strap for carrying the bag when disengaged from the handlebar. No additional strap segments or components are required. Furthermore, the bag is readily attachable and removable from virtually any style of handlebar, and no special modifications need to be made to the bicycle to which the bag is attached.

Accordingly, it is an object of the present invention to provide a combination bicycle bag and handbag which is easily convertible from a bag attached to the handlebar of a bicycle to a handbag with a shoulder strap; a bag which is readily attachable to and detachable from a handlebar and does not require additional components to be added to the bag or to the bicycle to which it is attached; and a bag which functions as either a bicycle bag or a handbag and is of simple construction and is economical to manufacture.

Other objects and advantages of the invention will be apparent from the following description, the accompanying drawings and the appended claims.

BRIEF DESCRIPTION OF THE DRAWINGS

FIG. 1 is a perspective view of a preferred embodiment of the combination bicycle bag and handbag of the present invention, shown mounted on a handlebar crossbar;

FIG. 2 is a detail of the bag of FIG. 1, showing a pair of complementary fastener members and in which the bag body and handlebar crossbar is in section;

FIG. 3 is a perspective view of the bag of FIG. 1, shown being carried by a user;

FIG. 4 is a detail of the fastener member of an alternate embodiment of the invention, in which the strap is shown looped about a handlebar crossbar which is in section; and FIG. 5 is a top plan view of the bag of FIG. 1.

DETAILED DESCRIPTION OF THE PREFERRED EMBODIMENTS

As shown in FIG. 1, the combination bicycle bag and handbag of the present invention, generally designated 10, includes a bag body 12 and a unitary, continuous strap 14 which is attached at is ends to the bag body. The strap 14 includes pairs of fastener members 16, 18 (see FIG. 5) so that the strap can be looped about the crossbar 20 of a handlebar 22.

As shown in FIGS. 1, 2, and 5, the bag body 12 includes a continuous side panel 24 having ends which meet to form a longitudinal slit 26 which can be opened and closed by a slide fastener 28. The bag body includes end panels 29 which are attached to the side panel 24. The ends 30, 32 of the strap 14 are sewn into the seams 34 attaching the slide fastener 28 to the side panel 24 (one of which is shown in FIG. 2).

The bag body 12 is made of a flexible material, such as plastic, and the straps are made of plastic-coated fabric. However, other types of strong flexible material may be used, such as nylon mesh.

In the preferred embodiment, the pairs of fastener members 16, 18 each include a strip loop material 36, positioned adjacent to the ends 30, 32 of the strap 14, and a strip 38 of hook material, positioned adjacent to strip of loop material. In the preferred embodiment, the strap 14 is made of a woven, plastic impregnated fabric, and the strips 36, 38 of hook and loop material are stitched to the fabric.

As shown in FIG. 2, the bag 10 is attached to a handlebar crossbar 20 by looping a portion 40 of the strap 14 extending between the strips of hook and loop material 36, 38 about the outer periphery of the crossbar 20, then joining the strips together. Although FIG. 2 shows only the attachment scheme for end 32 of strap 14, the attachment scheme for end 30 is identical, as shown in FIG. 1. The result is that the bag body 12 is suspended from the crossbar 20 by the ends 30, 32 of the strap 14.

As shown in FIG. 3, the bag 10 is removable from the crossbar 20 by disengaging the strips of hook and loop material 36, 38 from each other (FIG. 5). The strap 14 functions as a shoulder strap so that the bag can be suspended from the shoulder of a user 42.

As shown in FIG. 4, in an alternate embodiment of the invention, the bag 10' includes a strap 14' in which the fastener members 18' (only one of which is shown) comprise snaps 44 having male and female components 46, 48 which are attached to the strap. The male and female snap elements 46, 48 are spaced from each other a distance equivalent to the portion 40' which extends about the outer periphery of the crossbar 20.

The bag 10' is attached to and removed from the crossbar 20 in a manner similar to that for the preferred embodiment shown in FIGS. 1, 2, and 5. The strap 14' is folded over the crossbar 20 so that the portions 40' extend about the crossbar, and the male and female portions 46, 48 of the snaps are engaged. Removal of the bag 10' from the crossbar 20 is a simple matter of disengaging the snaps 44 and pulling the bag away from the crossbar.

While the forms of apparatus herein described constitute preferred embodiments of this invention, it is to be understood that the invention is not limited to these precise forms of apparatus, and that changes may be made therein without departing from the scope of the invention.

What is claimed is:

1. A combination bicycle bag and shoulder-type handbag for quickly releasable mounting on a predetermined normally substantially horizontal bar on a bicycle, comprising:
   (a) A bag body,
   (b) a strap of one-piece construction having opposite ends fastened to spaced portions of said bag body and extending perpendicular to the length thereof,
   (c) said strap being of appropriate length to suspend said bag from a shoulder of a person,
   (d) a set of first and second complementary fastening members mounted near each of said opposite ends of said strap,
   (e) said first member of each of said sets being positioned on said strap in closely spaced relation with the adjacent said end of said strap,
   (f) said second member of each of said sets being positioned on said strap in spaced relation with the adjacent said first member, and
   (g) each said set of fastening members being of such combined length and spacing that the portion of said strap on which they are mounted is of a length to surround said bicycle bar and to bring said set of fastening members into complementary engagement, whereby said bag may be releasably mounted on such bicycle bar by looping each portion of said strap having said complementary fastening members thereon about said bar and fastening said fastening members together.

2. A combination bag as defined in claim 1 wherein said means fastening said strap ends to said body effect a substantially permanent attachment thereof.

3. A combination bag as defined in claim 1 wherein said first and second fastener members are constructed to fasten themselves together in response to direct movement thereof toward each other and to separate from each other in response to direct movement thereof away from each other.

4. A combination bag as defined in claim 1 wherein said first and second fastener members comprise strips of hook and loop material.

5. A combination bag as defined in claim 1 wherein said first and second fastener members comprise complementary snap elements.

* * * * *